United States Patent Office 2,845,361
Patented July 29, 1958

2,845,361
VISCOSITY CONTROLLING METHOD

John R. Maddox, Lancaster, Pa., assignor to Armstrong Cork Company, Lancaster, Pa., a corporation of Pennsylvania No Drawing. Application February 27, 1956
Serial No. 567,713

5 Claims. (Cl. 106—123)

This invention relates generally to gelled compositions of matter, and more particularly to a gelled composition comprising a limed mixture of tall oil and petroleum oil. Still more particularly, the invention relates to a method of controlling the viscosity of the above-described gelled compositions, particularly during the manufacture thereof.

Tall oil is a mixture of rosin acids and fatty acids containing a small percentage of unsaponifiable matter. A typical analysis of tall oil is fatty acids 42%, rosin acids 51%, and unsaponifiable matter including sterols 7%. Crude tall oils will vary somewhat from this typical analysis. Additionally, the tall oil may have been treated to recover a portion of either the rosin acids or the fatty acids. Such tall oils will exhibit variations in composition from the typical analysis given above. To be useful in the gelled compositions, which are the concern of the present invention, the tall oil should contain about 35%–65% by weight rosin acids, and preferably 45%–55% by weight rosin acids. Since the gelled condition is brought about by the liming of the fatty acids, the tall oil should contain at least about 30% by weight fatty acids. A typical analysis of the fatty acids in tall oil is saturated fatty acids 6%, oleic acid 48%, linoleic acid 45%, and linolenic acid 1%.

The hydrocarbon oil to be mixed with the tall oil is a petroleum oil having an aniline point in the range of about 150°–225° F. (A. S. T. M. D–611—latest revision). A fully paraffinic oil is too incompatible with the soaps formed in the liming of the tall oil. For this reason, there should be sufficient aromatic constituents in the petroleum oil to render it compatible with the limed tall oil. Although the hydrocarbon oil may be present in the final composition to the extent of about 30%–70% by weight, it is preferred that the gelled composition comprise about 50% hydrocarbon oil and 50% limed tall oil.

The general procedure for preparing the gelled composition is to heat the tall oil-hydrocarbon mixture in the range of about 300°–385° F. The lime may then be slowly added. The word lime as used herein refers to both lime itself (CaO) and to hydrated lime (Ca(OH)$_2$). A catalyst such as calcium acetate is preferably present to aid the reaction. An inert gas such as nitrogen is preferably introduced into the bottom of the reactor to blanket the reactants and protect them from the effects of oxygen in the air; the gas also agitates the mixture and aids in removing water vapor. The lime may be added in solid form, but it is more convenient to slurry the lime in a portion of the hydrocarbon oil and add the slurry to the tall oil-hydrocarbon oil mixture. The lime must be added slowly, since the neutralization reaction produces water as a by-product and foaming results therefrom.

The amount of lime to be added is such as will produce an acid number of less than about 8, and preferably in the range of about 0–5 in the final gelled composition. In view of the nature of the reaction, however, it is more convenient to use the viscosity of the gelled composition as a criterion for determining the end point of the reaction. A viscosity end point may be chosen according to the use for which the gelled composition is designed. It has been found that when the gelled composition is to be used as a plasticizer in an asphalt tile binder system, the broad end point lies between about 1600 and 2800 centipoises, and preferably between 2000 and 2400 centipoises, as measured by the Brookfield viscosimeter at 350° F. Thus, the end point is determined both by the acid number and the viscosity as described above.

Toward the end of the reaction, there is an appreciable interval of time between the last addition of lime and the attainment of equilibrium in the reaction mixture. Thus, it is difficult to forecast the end of the reaction in terms of acid number and viscosity which will exist once equilibrium has been reached. Accordingly, a great many batches of the gelled composition may be processed too far; that is, the viscosity will be too high for the designed use. It is at this point that the present invention comes into play.

Accordingly, it is an object of the present invention to supply a method for controlling the viscosity of a gelled limed tall oil-hydrocarbon mixture.

This object and other objects have been achieved in a straight-forward and surprisingly effective manner. The invention contemplates controlling the viscosity of the above-described gel composition by adding rosin thereto.

The effect of the rosin on the viscosity of the gelled composition is out of all proportion to the amount of rosin used; the effect is not at all what one would normally anticipate. In one instance, the addition of 10% wood rosin based on the total weight of the batch converted the batch to a thin watery material on which no viscosity measurement with the Brookfield viscosimeter could be recorded down to a temperature of 300° F. It has been found that an amount of rosin of about 0.1%–2.5% by weight of the total batch will reduce the viscosity either to the point desired or to the point where the addition of a little more lime will produce the desired viscosity. The preferred limits are 0.5%–1% by weight rosin. As a practical matter, the viscosity of the gelled composition may be reduced repeatedly by small rosin additions should there be difficulty in attaining the desired viscosity. The amounts of wood rosin needed to reduce the viscosity are so small that repeated additions of these small amounts have little or no effect on other characteristics of the final gelled composition.

The outstanding advantage of the present invention resides in the fact that the liming step is a relatively uncertain one. The lime neutralizes substantially all of the fatty acid in the tall oil along with a substantial portion of the rosin acids. The precise extent of the liming reaction is difficult if not impossible to ascertain. The amount of lime to be added can readily be approximated through use of the acid number of the mixture to be limed by methods well understood by those skilled in the art. The catalyst is of great aid in reducing the reaction time and in producing consistent results; the amount of catalyst will usually be in the range of about 1%–3%, preferably about 2%, by weight based on the amount of lime to be added. Yet in spite of all, the end point is commonly overrun, thus giving rise to a need for a simple and effective means for reducing the viscosity of the gelled composition.

Commercial grades of rosin will normally be used; impurities in such rosins have little or no effect on the method of the present invention. A rosin-containing solution or suspension may be used, it being understood that the amount of such solution or suspension need be adjusted, depending on the rosin content.

The following example will serve to further illustrate the invention.

EXAMPLE

To a large kettle was charged 7500 pounds crude tall oil and 5700 pounds naphthenic petroleum oil having an aniline point of 172° F. (A. S. T. M. D-611—latest revision). The mix was heated to 385° F. and nitrogen gas was bubbled through the batch once the temperature reached 365° F.

A lime slurry in petroleum oil was prepared separately by mixing 2300 pounds of the hydrocarbon oil, 815 pounds hydrated lime, and 18 pounds of calcium acetate. This slurry was pumped through a steam-heated line to the top of the reaction vessel and carefully fed into the agitated mixture of heated tall oil and hydrocarbon oil.

For the first 75 minutes the lime slurry was added at the rate of 25–30 pounds per minute. Subsequently, the foaming made necessary a reduction in the rate of addition of the lime slurry. The addition of the lime slurry was completed after 3½ hours. The temperature of 385° F. was maintained for one hour after all the lime had been added.

The resulting gelled composition was essentially a composition of 50% limed whole tall oil in 50% naphthenic petroleum oil of moderately high aniline point. The acid number was 5 and the ash content was 4%.

In a series of batches prepared as described above, it was found that the viscosity of the gelled composition was too high. Accordingly, varying amounts of rosin were added to the composition. The viscosity was determined in each case with a Brookfield viscosimeter and the temperature at which the viscosity was determined was 350° F.

*Table A*

| Run No. | Initial Viscosity of gel, cps. | Final Viscosity, cps. | | |
|---|---|---|---|---|
| | | 0.5% Rosin | 0.75% Rosin | 1% Rosin |
| 1 | 4,800 | | | 680 |
| 2 | 4,520 | | 1,000 | |
| 3 | 6,080 | 1,960 | | |
| 4 | 2,160 | 880 | | |
| 5 | 1,800 | 760 | | |
| 6 | 4,680 | | 1,200 | |

It should be noted that runs 4 and 5 showed a viscosity within the desired range of 1600–2800 centipoises initially. However, 0.5% rosin was added to these batches to demonstrate the effect of rosin on those batches having a lower viscosity. Run 3 illustrates a case where a high viscosity was dropped to a viscosity within the desired range by the mere addition of 0.5% rosin. All other runs dropped the viscosity too far for this intended purpose and would require additional lime to bring the viscosity up to the desired value for use as a plasticizer in an asphalt tile binder system.

I claim:

1. In the method of forming a gelled composition comprising (1) about 70%–30% by weight tall oil containing at least about 30% by weight fatty acids and (2) about 30%–70% by weight petroleum oil having an aniline point in the range of about 150°–225° F. containing sufficient aromatic constituents to render said petroleum oil compatible with the limed tall oil by adding sufficient lime to give an acid number of less than about 8 to a mixture of the tall oil and the petroleum oil heated to a temperature in the range of about 300°–385° F., the improved method of reducing the viscosity of said gelled composition maintained in said temperature range which comprises adding rosin thereto.

2. The method according to claim 1 wherein said gelled composition comprises about 50% by weight limed tall oil and about 50% by weight petroleum oil.

3. The method according to claim 1 wherein said rosin is added to said gelled composition in an amount of about 0.1%–2.5% by weight of said gelled composition.

4. The method according to claim 3 wherein said rosin is added in an amount of about 0.5%–1% by weight of said gelled composition.

5. The method according to claim 1 followed by the step of adding lime to the composition to increase the viscosity.

References Cited in the file of this patent

UNITED STATES PATENTS

| | | |
|---|---|---|
| 2,367,462 | Farber | Jan. 16, 1945 |
| 2,373,709 | Rice | Apr. 17, 1945 |
| 2,610,924 | Lamm | Sept. 16, 1952 |
| 2,616,814 | Mahler | Nov. 4, 1952 |